July 26, 1949.　　　　　T. H. PEIRCE　　　　　2,477,081
MEANS FOR DAMPING TORSIONAL VIBRATIONS
IN INTERNAL-COMBUSTION ENGINES Filed June 27, 1945　　　　　　　　　　　3 Sheets-Sheet 1

INVENTOR.
Thomas H. Peirce.
BY
Harness, Dickey & Pierce.
ATTORNEYS

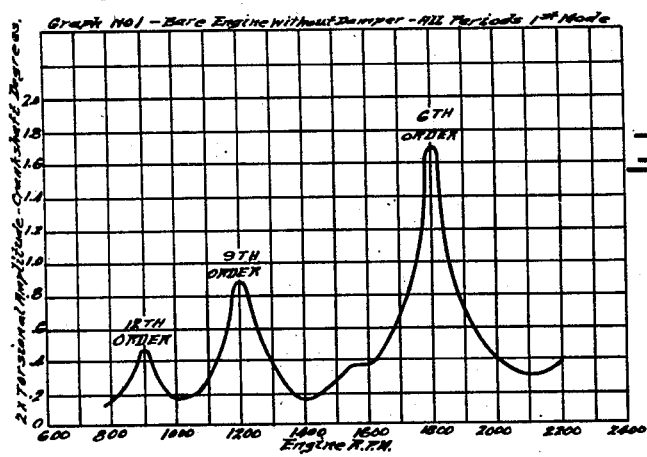
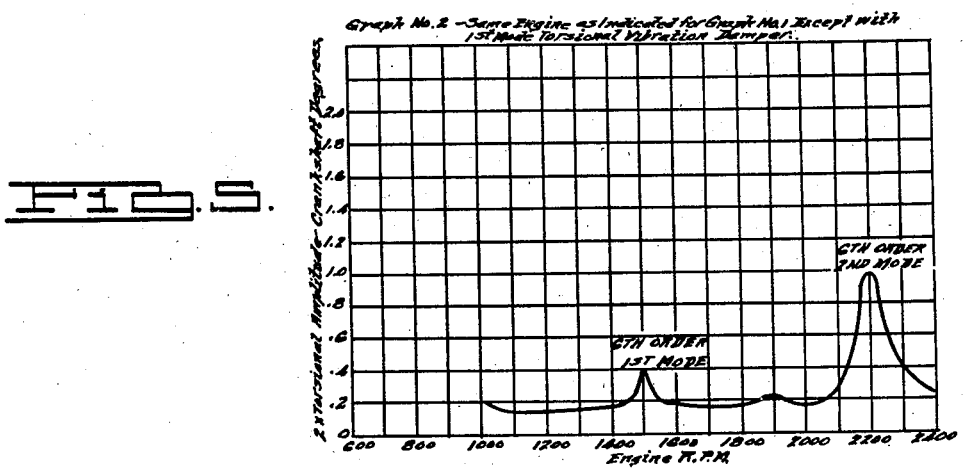
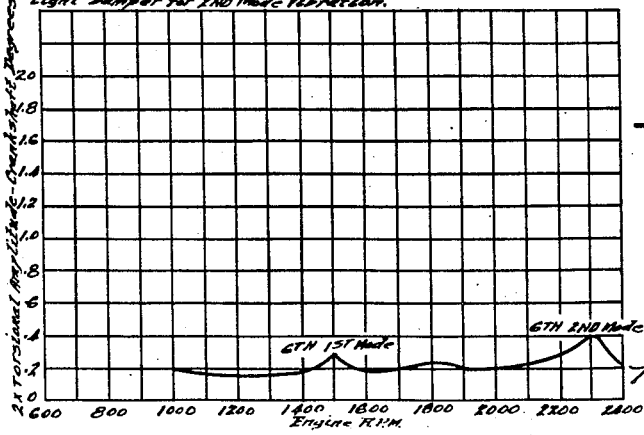
INVENTOR.
Thomas H. Peirce.
BY
ATTORNEYS.

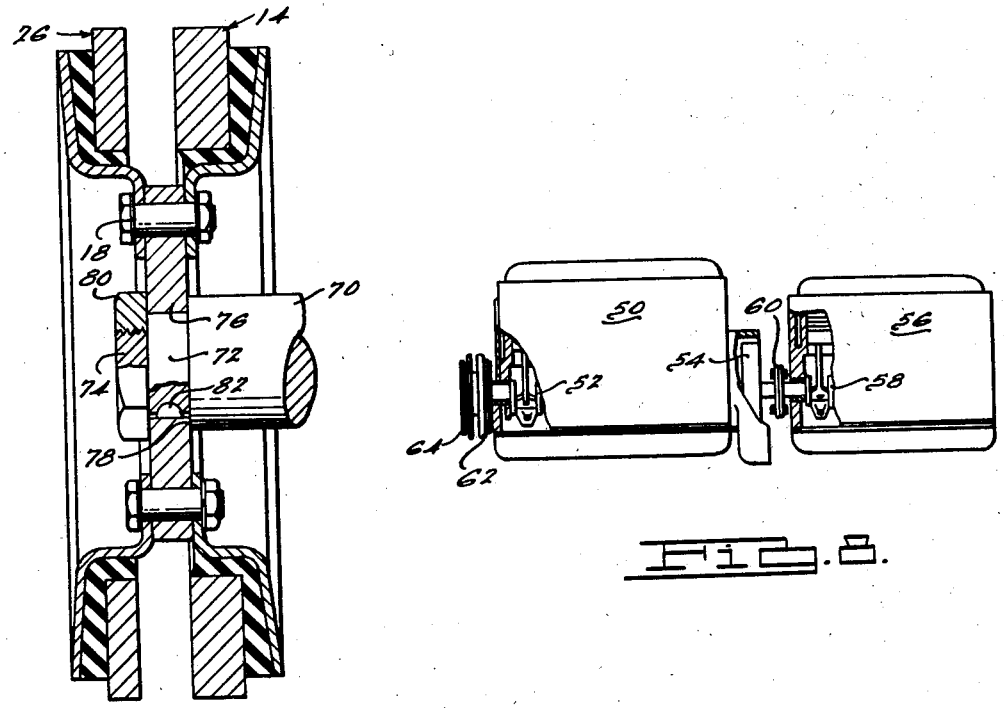
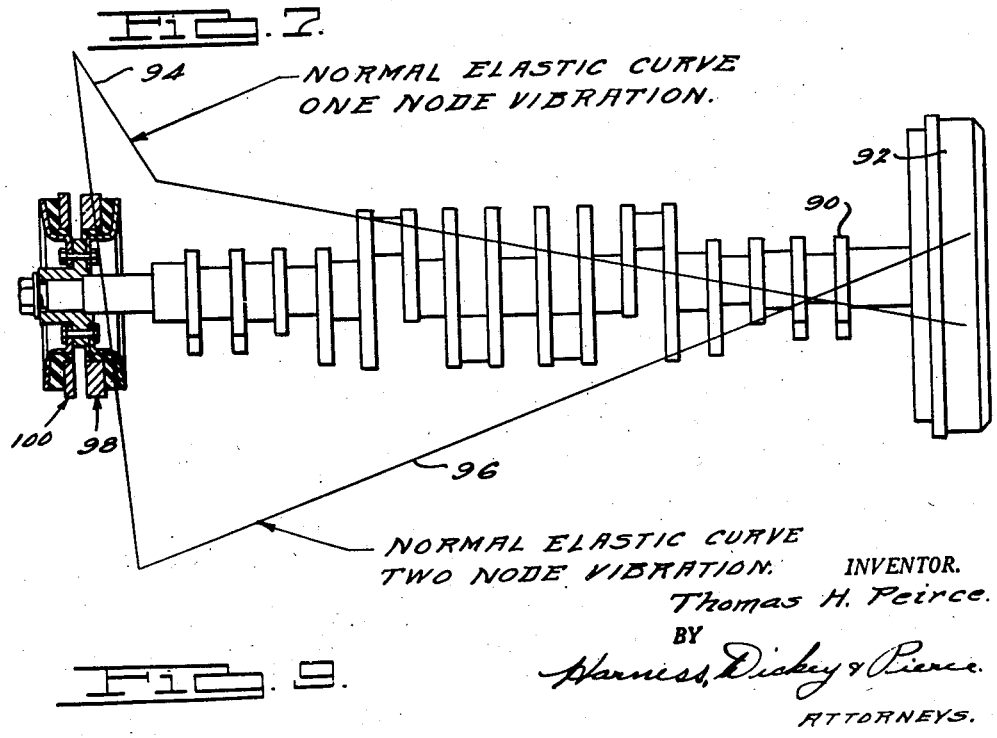

Patented July 26, 1949

2,477,081

UNITED STATES PATENT OFFICE 2,477,081

MEANS FOR DAMPING TORSIONAL VIBRATIONS IN INTERNAL-COMBUSTION ENGINES

Thomas H. Peirce, Detroit, Mich., assignor to Harold A. King, San Marino, Calif.

Application June 27, 1945, Serial No. 601,790

11 Claims. (Cl. 74—574)

This invention relates to internal combustion engines and particularly to such engines as are provided with resiliently mounted torsional vibration dampers of the dynamic type on the crankshaft thereof, the principal object being the provision of a plurality of such torsional vibration upon the crankshaft of an engine subject to a plurality of torsional vibrations each of a different fundamental frequency or mode, and is a continuation in part of my application for Letters Patent of the United States for improvements in Internal combustion engine, filed October 17, 1942, and serially numbered 462,375, now abandoned.

Objects of the invention include the provision of means for damping a plurality of torsional vibrations in a multi-throw internal combustion engine crankshaft wherein each of said vibrations has a fundamental frequency different from each other thereof; the provision of a construction as above described in which the means for damping the torsional vibrations are dynamic types of torsional vibration dampers mounted on the crankshaft at the end thereof opposite the flywheel; and the combination in a multi-cylinder internal combustion engine having a multi-throw crankshaft provided with a flywheel at one end thereof which crankshaft is subject to a torsional vibration having one fundamental frequency and is also subject to another torsional vibration having a different fundamental frequency, of a pair of dynamic type of torsional vibration dampers mounted on the crankshaft at that end thereof opposite the flywheel, the one damper being tuned to dampen the torsional vibrations of the one fundamental frequency and the other thereof being tuned to dampen the torsional vibrations in the crankshaft of the second fundamental frequency.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a partially broken, partially sectioned side elevational view of a multi-cylinder in-line engine having a crankshaft provided with a flywheel mounted on one end thereof, the crankshaft being torsionally vibratile at two fundamental frequencies which become excessive at engine speeds within the operating speed of the engine and such vibration being damped by a pair of dynamic torsional vibration dampers secured to that end of the crankshaft opposite the flywheel;

Fig. 4 is a graph showing a curve obtained by plotting the amplitude of torsional vibrations against engine speed for the crankshaft in Fig. 3 but without any vibration dampers secured thereto and considering only the first mode vibration frequency, that is torsional vibrations having a single node as indicated in Fig. 3;

Fig. 5 is a graph similar to the graph shown in Fig. 4, showing a curve of the torsional vibrations in the same crankshaft as considered in Fig. 4, but in which the curve is obtained by plotting the amplitude of torsional vibrations in the crankshaft against engine speed with only the heavier torsional vibration damper secured to the crankshaft;

Fig. 6 is a graph similar to Figs. 4 and 5 but illustrating the curve obtained by plotting the amplitude of torsional vibrations against engine speed after the second vibration damper has been applied to the same crankshaft;

Fig. 7 is a view similar to Fig. 2 but showing a modified method of mounting the vibration dampers on the crankshaft;

Figure 1:
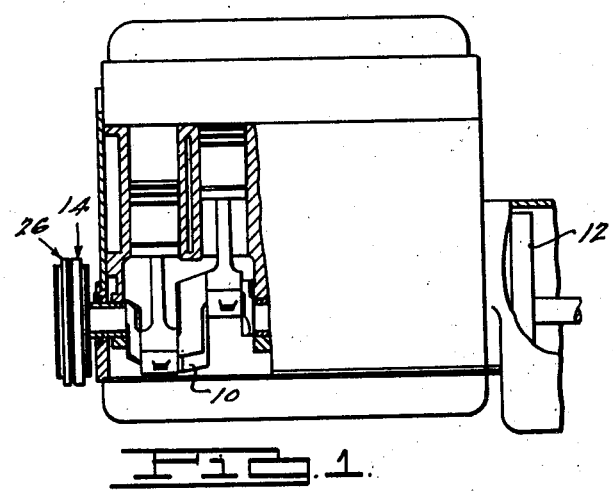
Figure 3:
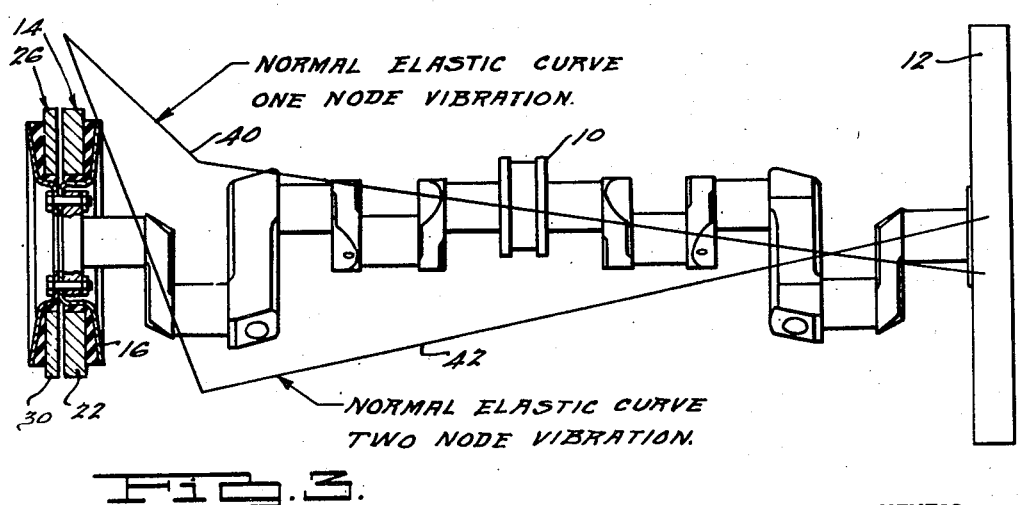
Fig. 3 is a side elevational view of the crankshaft shown in the engine in Fig. 1 removed therefrom, and showing the vibration dampers mounted thereon in sectional view, the view also indicating the normal elastic curve of the two different modes of torsional vibrations to which the crankshaft is subjected.

Fig. 8 is a view similar to Fig. 1 but illustrating an additional driven mass, here shown as a compressor driven by the crankshaft as the flywheel end of the engine and which, and in similar instances, may cause a second mode of torsional vibration to appear in the crankshaft of the engine, that is, a torsional vibration having a fundamental frequency different from and in addition to that of the first mode one node torsional vibration normally found in such crankshafts; and, Fig. 9 is a view similar to Fig. 3 but illustrating the invention applied to a crankshaft for an eight cylinder in-line engine.

As is commonly understood by those skilled in the art, multi-throw crankshafts of internal combustion engines are commonly caused to torsionally vibrate, at certain engine speeds, because of the forces to which they are subjected during engine operation. Unless such vibrations are damped out, the engine may become exceedingly rough over that range of speeds at which the amplitude crankshaft torsional vibration is high, and the vibration may become so excessive as to cause breakage of the crankshaft or connected parts. In order to prevent such torsional vibrations from becoming harmful and to overcome the effect thereof, it is common practice to secure a vibration damper to one end of the crankshaft. In modern practice, such vibration damper is usually of the so-called dynamic type and takes the form of a mass adapted to rotate concentrically with the crankshaft and secured to the crankshaft through a suitable resilient connection, usually rubber. The value of such mass, in conjunction with the resiliency of its connection with the crankshaft, is such that it is put into vibration in opposition to the vibration of the crankshaft whenever the crankshaft vibrates in tune therewith and thereby acts to dampen such torsional vibrations in the crankshaft through hysteresis of the rubber. As is well known, dampers of this type are effective to dampen all vibrations occurring in the particular mode to which they are tuned, irrespective of the engine speed and the torque order or harmonic which may be causing the vibrations. Thus, the dampers referred to in this specification and in the claims are distinct from centrifugal pendulums which as stated on page 261 of the text "Mechanical vibrations," by J. P. Den Hartog, 2nd edition, cannot be considered as "dampers." Furthermore, the latter are tuned to the frequencies of the exciting torque whereas the present dampers are tuned to the natural shaft frequencies.

Figure 2:
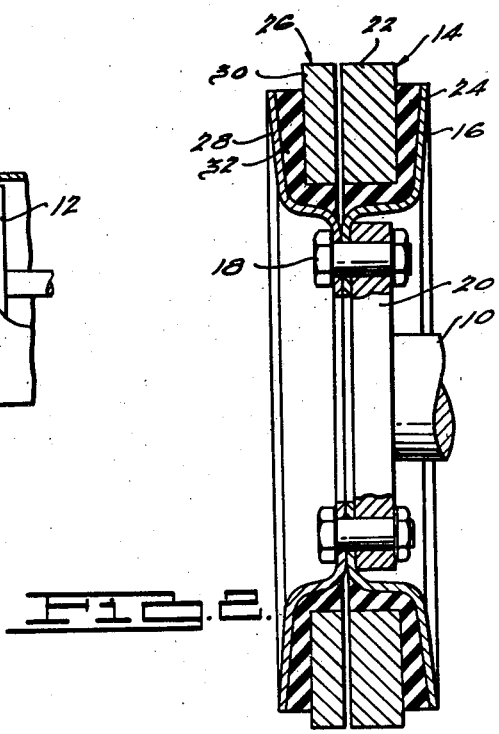
Fig. 2 is an enlarged fragmentary, sectional view taken diametrically through the vibration dampers secured to the crankshaft of the engine shown in Fig. 1.

As a matter of illustration and referring particularly to Figs. 1, 2, and 3, the engine there shown by way of illustration is a six-cylinder in-line engine having a six-throw crankshaft indicated generally at 10 and which, for the purpose of illustration, is shown as a six-throw four-bearing crankshaft, although it will be appreciated that the invention is applicable to any such crankshaft regardless of the number of bearings employed. Likewise the invention is applicable to any crankshaft subject to two modes of torsional vibration as hereinafter explained regardless of the number of throws. A flywheel 12 is rigidly secured to one end of the crankshaft 10 and, being a heavy mass and rigidly secured thereto, serves to maintain the corresponding end of the crankshaft, when rotating at a substantially constant velocity, against substantial torsional vibration and acts more or less as a reaction means from which the torsional vibrations of the crankshaft increase in amplitude approximately in accordance with the point of measurement from the flywheel.

To the end of the crankshaft 10 opposite the flywheel 12 a dynamic type of vibration damper indicated generally at 14 is mounted. It will be understood that the particular form and construction of the vibration damper employed is immaterial as long as it is of a suitable dynamic type, but in the particular case shown by way of illustration the damper 14 comprises a sheet metal supporting member 16 of more or less Z-shaped section, the radially inner flange of which is secured to the crankshaft 10 by means of bolts 18 passing through the flange 20 which may be formed integrally on the forward end of the crankshaft 10. Positioned substantially within the two remaining legs of the Z of the mounting member 16 in spaced and concentric relation therewith is a mass in the form of a metal ring 22 which is secured to the mounting member 16 by means of a body 24 of rubber or the like bonded both to it and to the mounting member 16.

In the particular case shown and in accordance with the present invention a second dynamic type of torsional vibration damper indicated generally at 26 is also secured to the forward end of the crankshaft 10. The damper 26 shown by way of illustration is of substantially the same construction as the damper 14 except reversed in direction and includes a similar sheet metal mounting member 28 the radially inner flange of which is secured in flat contacting relationship with respect to the radially inner flange of the mounting member 16 by the same bolts 18 that serve to secure the mounting member 16 to the crankshaft 10. Likewise the damper 26 includes a concentric ring-like mass 30 connected to the mounting member 28 by means of a mass of rubber or the like 32. The mass 30 in the particular case shown is of less mass than the mass 22 for reasons which will hereinafter be brought out in explaining the application of the second vibration damper 26 to the crankshaft. The masses 22 and 30, as well as the rubber bodies 24 and 32 are spaced from one another so as to have no effect on the operation of each other. The rubber bodies 24 and 32 may, or may not, be of the same dimensions, relative resiliency, etc., depending upon conditions met in design or for other reasons. It will be understood, however, that in no case will the two dampers 14 and 26 be identical on the same engine.

Prior to the present invention, crankshaft systems had been regarded as having only a single degree of freedom and, hence, only a single mode of vibration. In single mode vibrations, there is one node or one cross section which is not deflected. That is the elastic curve of such vibrations passed through the axis of the crankshaft in spaced but relatively closely arranged relation with respect to the flywheel and intersected the crankshaft at one point only. This curve is illustrated at 40 in Fig. 3 for the particular crankshaft shown.

A crankshaft such as is herein considered and, for instance, as shown at 10, seldom has an operating speed measured in revolutions per minute which is as high as its fundamental first mode frequency measured in cycles per minute, but the speeds are sufficient to give various harmonics or orders of the cyclic engine forces a frequency substantially the same as the fundamental first mode frequency. For instance, in a six-throw crankshaft such as usually employed in a six-cylinder in-line engine as shown in Fig. 1, or in a twelve-cylinder V-type engine, the crankshaft might vibrate due to the influence of fourth and one-half order, but more usually at a higher order, as, for instance, the sixth, ninth, or twelfth, and of these the most critical is usually the sixth. For instance, and as illustrated in Fig. 4, the crankshaft whose curve of torsional vibration is there shown has a maximum amplitude of the fundamental one node or first mode of torsional vibration due to excitation by the sixth order, a smaller but yet material amplitude due to the ninth order, and a still smaller amplitude due to the twelfth order. In this connection it will be understood that each order is effective in causing substantial vibration only when its frequency (order times engine speed) equals the fundamental frequency of the torsional vibration under consideration, so that in the case of the crankshaft 10 considered in Fig. 4, the fundamental frequency of the single node or first mode of torsional vibration will be 10,800 cycles per minute.

When a vibration damper is applied to a crankshaft which so vibrates, it is applied to a section of large vibratory deflection which is usually the end of the crankshaft opposite the flywheel, and because of its weight it provides an added mass to that end of the crankshaft subject to the greatest vibration and has the effect of lowering the fundamental frequency of such vibrations in the crankshaft so that the various orders may be in resonance with the fundamental frequency at lower engine speeds. In this connection, as is hereinafter more fully brought out, any mass which is rigidly secured to an engine crankshaft has the effect of lowering the fundamental frequency of torsional vibration or vibrations thereof. For instance, and as brought out in Fig. 5, which is a curve of the amplitude of torsional vibration of the crankshaft plotted against engine speed after the vibration damper 14 has been applied to the crankshaft 10 to dampen the vibrations indicated in Fig. 4, resonance of the sixth order with the single node vibration considered in Fig. 4 instead of occurring at 1800 R. P. M. now occurs at approximately 1500 R. P. M. and, because of the application of the vibration damper thereto, has been reduced to such a small amplitude that its effect is no longer harmful. The fundamental frequency of the single node or first mode vibration has been lowered from 10,800 to 9,000 cycles per minute by application of the damper.

As previously stated, prior to the present invention, as far as was known, crankshafts such as those herein considered were considered or designed to have only one fundamental frequency of torsional vibration in the normal operating range of the associated engine. The discovery of the present invention resulted in testing a six-cylinder engine, which may be considered to be the engine shown in Fig. 1 and which was devoid of vibration damping means, to determine the advisability, or necessity, of applying a torsional vibration damper thereto. Upon making such tests and plotting the amplitude of torsional vibration against engine speed, a curve substantially as illustrated in Fig. 4 was obtained, indicating the desirability of reducing the amplitude of the torsional vibrations. Accordingly, with all of the factors known, a vibration damper, which may be considered as the damper 14, was designed to dampen out the vibrations occurring in such crankshaft, was applied to the engine, the engine then tested to determine the efficiency of the vibration damper thus designed and applied, and a curve was then drawn by charting the amplitudes of torsional vibration against engine speed with the result shown in Fig. 5, namely, the appearance of a torsional vibration of dangerous amplitude still present in the crankshaft.

The natural assumption of the appearance of such vibration of dangerous amplitude was, of course, that some mistake had been made in calculating the values of the vibration damper 14 thus applied, but a re-check of such calculations failed to disclose any errors. Then upon closer observance of the resulting curve, as indicated in Fig. 5, it was discovered that the speed at which the maximum amplitude of torsional vibration occurred was not at the speed at which it originally occurred when the crankshaft was not provided with a vibration damper, but in fact occurred at a considerably higher speed. It was also discovered that the application of the damper 14 to the crankshaft now caused the former critical sixth order disclosed in the original crankshaft and as brought out in Fig. 4 to cause vibration to occur at an engine speed of approximately 1500 R. P. M. and had reduced its amplitude to a value of no importance as far as engine operation was concerned. Moreover, the engine speed at which the critical vibration now appeared was a speed at which no order was in resonance with the fundamental frequency of vibration considered in the original crankshaft.

The conclusion was then reached that the new vibrations which appeared in the shaft after the addition of the first damper were at a second frequency which was higher than and in addition to the frequency previously considered. Further investigation proved this last conclusion and disclosed that the crankshaft was subject to a second torsional vibration having a natural fundamental frequency different from that of the first torsional vibration discovered, but the critical speeds at which the second vibration occurred were not apparent until the vibration damper has been applied to the crankshaft to dampen out the vibrations of the first discovered frequency. Additionally, it was discovered that this second torsional vibration was a two node vibration, that is and as brought out in Fig. 3, the elastic curve 42 of this second vibration crossed the crankshaft in two places, the first adjacent to the flywheel but spaced outwardly therefrom by a slightly greater distance than the point of intersection of the elastic curve 40 of the first or one node vibration, and again crossing the axis of the crankshaft adjacent its free end, that is the end opposite the flywheel 12, as brought out in Fig. 3. The particular crankshaft under consideration was, therefore, found to have a natural fundamental frequency of torsional vibration of one value and a second natural fundamental frequency of torsional vibration of another value, the first having a single node and the second having two nodes. As a matter of convenience the first described frequency is referred to as the first mode of torsional vibration and the second as the second mode of torsional vibration.

The existence of this second mode of torsional vibration in the crankshaft apparently presented a difficult problem. It was not thought that the addition of a second damper would be a satisfactory solution to the problem in view of the fact that the application of a vibration damper to a crankshaft reduces the frequency of the fundamental vibration which it is intended to dampen, it being naturally assumed that the application of the second damper would so vary the natural frequency of the first mode of torsional vibration as to render the first applied damper no longer capable of satisfactorily damping out vibration of the first mode. Nevertheless a second vibration damper, namely the damper 26, was designed and applied to the outer end of the crankshaft 10 in addition to the first applied damper 14, with the discovery that not only was the first applied damper 14 still effective in damping out the vibration of the first mode and without substantial change in the frequency thereof, but the addition of the second damper 26 also was effective in damping out the second mode vibration, all as brought out in Fig. 6 which shows a curve of the torsional vibrations of the crankshaft plotted against engine speeds where the crankshaft is provided with the two vibration dampers 14 and 26 referred to.

It is, of course, assumed that instances may arise where one or more additional modes of torsional vibration may appear in an engine crankshaft and that in such event additional vibration dampers may be applied to the outer end of the crankshaft to dampen out the same with the same result as is described herein for separately damping out two different modes of torsional vibration.

Investigations indicate that to all probabilities most crankshafts, and particularly multi-throw crankshafts, have two and possibly more different fundamental frequencies of torsional vibrations but that ordinarily all except the lowest fundamental frequency are not apparent over the range of ordinary engine speeds. Vibrations at these higher frequencies do not become apparent, if at all, until the speed of engine operation is so increased over that of conventional structures, or some change is made in the crankshaft system which acts to so lower the fundamental natural frequencies of vibration thereof that the higher fundamental frequency vibration occurs within the engine operating speeds. It will be understood that in the majority of cases, particularly with engines of present design, the application of one damper to the crankshaft will ordinarily fail to lower the frequency of torsional vibration thereof to such a point that vibrations of a higher fundamental frequency become apparent during normal operation and require a second damper to be applied. In the particular case discussed above, it was the application of the first damper 14 to the crankshaft which lowered its natural fundamental frequency of torsional vibration to such an extent that two different fundamental frequencies of torsional vibration became apparent in the crankshaft within the engine operating range. This second mode of torsional vibration which thus becomes apparent being of a higher frequency than the first mode explains why, other factors being equal, the mass 30 of the damper 26 in the construction shown is less than the mass 22 of the damper 14.

Following the same reasoning as above set out, it will be appreciated that anything, whether it be a vibration damper or not which is connected into the crankshaft system of an engine in such a manner as to lower the fundamental frequency of the first mode of torsional vibration thereof, may be sufficient to introduce the second mode of torsional vibration within the operating range of the engine. As a matter of illustration of the last-mentioned point, in Fig. 8 there is more or less diagrammatically illustrated a multi-cylinder in-line internal combustion engine indicated generally at 50 having a muti-throw crankshaft 52 and a flywheel 54 secured at one end thereof. A conventional type of compressor 56 has the crankshaft 58 thereof connected to the crankshaft 52 of the engine 50 by means of a rigid coupling 60. The crankshaft 52 of the engine 50 when disconnected from the compressor 56 is assumed to be subjected during normal operation to a first mode of torsional vibration only which is damped out by securing to that end of the crankshaft 52 opposite the flywheel 54 a torsional vibration damper 62 which, for instance, may be identical to the torsional vibration damper 14 heretofore described. It is assumed in this case that the application of the torsional vibration damper 62 to the crankshaft 52 will not reduce the fundamental frequency of torsional vibration of the crankshaft 52 sufficiently to make oscillations in the second mode of torsional vibration of the crankshaft apparent within the normal engine operating speed range. However, because the crankshaft 58 of the compressor 56 or driven unit is connected to a crankshaft 52 of the engine 50, this may, and it is assumed herein that it will, so lower the natural frequencies of torsional vibration of the crankshaft 52 that one or more additional modes of torsional vibration will become apparent in the crankshaft 52 during normal operation of the engine 50. Therefore, to dampen out these, a second dynamic type of torsional vibration damper 64 is secured to the end of the crankshaft 52 opposite the flywheel in addition to the damper 62. It may be assumed in this instance that the damper 64 is identical to the damper 26 previously described.

It might be noted that if the coupling 60 between the compressor 56 and the engine 50 was a flexible type of coupling the possibilities are that this second mode of torsional vibration would not become apparent in the crankshaft 52 during normal operation of the engine 50, but there are instances of which this is assumed as one, where rigid couplings are desired in connecting a driven part or mechanism to an internal combustion engine employed to drive it. In all such instances where a second mode of torsional vibration becomes apparent in the crankshaft of the driving engine the practice of the present invention will dampen out the objectionable vibration thereof.

Fig. 7 illustrates a slightly modified method of mounting the vibration dampers of the present invention upon the end of an engine crankshaft. In this case the crankshaft is indicated generally at 70 and as having at its outer end a concentric mounting portion 72 terminating in a stud 74. A flange member 76 is closely received on the mounting portion 72 against the shoulder 78 formed between it and the adjacent journal of the crankshaft 70 and is clamped against the shoulder by means of a nut 80 threaded on the stud 74. A key 82 is provided between the flange member 76 and the mounting portion 72 to lock the flange portion 76 against rotation. A pair of vibration dampers here shown as the same dampers 14 and 26 as employed in the first-described construction are secured to the flange 76, but in this case to opposite sides thereof by means of the same bolts 18 as employed in the first-described construction. Where, as in this case, the vibration dampers are secured to opposite sides of the flange, it will be appreciated that it is necessary to make the flange removable from the crankshaft as disclosed in this view, for assembly purposes. The results, however, will be identical to those of the first-described construction as will be readily understood.

In Fig. 9 the application of the present invention to an eight throw crankshaft indicated generally at 90 is shown. This crankshaft may be for an eight cylinder in-line engine or a sixteen cylinder V-type engine. One end of the crankshaft has a conventional flywheel 92 conventionally secured thereto. As in the crankshaft shown in Fig. 3, this crankshaft 90 has a first mode of torsional vibration the elastic curve of which is indicated at 94 and as in the described construction this intersects the crankshaft 90 at one point only. In other words, it is a one node vibration. The crankshaft 90 also vibrates torsionally within the normal operating range of the engine at a second frequency. In other words, it has a second mode of torsional vibration and the normal elastic curve of this last vibration is indicated at 96 and, similar to the curve 42 of the first described construction, intersects the crankshaft twice and is, therefore, a two node vibration. This same situation obtains in any crankshaft having two different modes of torsional vibration occurring within the normal operating range of the engine. In the present case the vibrations of the first mode are damped out by the application of a dynamic type of torsional vibration damper indicated generally at 98 and the vibrations of the second mode are damped out by a dynamic type of torsional vibration damper indicated generally at 100, secured to the end of the crankshaft 90 opposite the flywheel 92. The dampers 98 and 100 are generally of the same construction as those previously described and it is not necessary to describe them in detail for that reason.

Having thus described my invention, what I claim by Letters Patent is:

1. A torsional vibration damper for overcoming two modes of vibration comprising, in combination, a pair of radial flanges fixed together, a pair of annular inertia members of different masses, and separate rubber sections of different masses individually connecting the members in a resilient manner each to a different flange, each combination of member and rubber section having a different natural frequency than the other and forming means for damping substantially all torsional vibrations in a mode of torsional vibration to which it is tuned.

2. In an internal combustion engine having a crankshaft provided with a flywheel at one end thereof, said crankshaft having a natural frequency of torsional vibration with one mode of torsional vibration within the operating speed range of said engine, the combination of a dynamic torsional vibration damper secured to the end of said shaft remote from said flywheel, said damper lowering said natural frequency and being tuned to damp torsional vibrations in the mode of said frequency, said crankshaft when assembled with said damper having another natural frequency of torsional vibration with a different mode of torsional vibration within the operating speed range of the engine, and a second dynamic torsional vibration damper secured to said remote end of said shaft for damping vibrations in the mode of said other frequency, said dampers being of the type that is tuned to suit the frequency of a mode of shaft vibration and is operative at all of the different order critical speeds of that mode to dampen all vibrations in said mode.

3. In a multi-cylinder internal combustion engine, a crankshaft having a flywheel secured to one end thereof, said crankshaft in undamped torsionally vibratable condition having a first mode of vibration with a peak amplitude of torsional vibration at a first frequency within the engine operating speed range, the combination of a dynamic torsional vibration damper secured to that end of said crankshaft opposite said flywheel and causing said peak amplitude to appear at a lower frequency and at lower engine speeds and acting to dampen the resulting peak amplitude, the combination of said damper and said crankshaft also causing a second mode of vibration with a peak amplitude of vibration at a higher frequency than the first to appear at an engine speed within the engine operating speed range, and a second dynamic torsional vibration damper secured to said crankshaft at that end thereof opposite said flywheel and tuned to damp the peak amplitude of the last mentioned frequency, said dampers being of the type that is tuned to suit the frequency of a mode of shaft vibration and is operative at all different order critical speeds of that mode to dampen all vibrations in said mode.

4. In combination, an internal combustion engine, a crankshaft therefor having a flywheel secured to one end thereof, said crankshaft being subject to torsional vibration at a first frequency range due to resonance with the forces exerted upon it by said engine, a dynamic torsional vibration damper fixed to said crankshaft at that end thereof opposite said flywheel, said damper lowering said first frequency range and being tuned to dampen torsional vibrations in said first frequency range, a device driven from said engine and connected thereto for driving movement therefrom, operation of said device at certain engine speeds causing additional torsional vibrations at a second and different frequency range to occur in said crankshaft having said damper affixed thereto, and a second dynamic torsional vibration damper attached to said crankshaft at that end thereof opposite said flywheel and tuned to dampen said additional torsional vibrations from said crankshaft in said second frequency range, said dampers being of the type that is tuned to suit a frequency range of shaft vibration and is operative to dampen all vibrations in said range regardless of the order of the exciting torque causing vibration in said range.

5. In an internal combustion engine, in combination, a crankshaft, a flywheel secured to one end of said crankshaft, and a pair of dynamic torsional vibration dampers secured to the opposite end of said crankshaft, said crankshaft with said dampers thereon having one mode of vibration with a characteristic first frequency and a node located on the axis of said shaft between said dampers and said flywheel, and also having a second mode of vibration with a characteristic second frequency not harmonically related to the first frequency and having a node located in the axis of the shaft between said dampers and said flywheel and axially spaced from the first mentioned node, one of said vibration dampers lowering the original characteristic frequencies of torsional vibration of the undamped shaft and being tuned to dampen first mode vibrations in the first frequency and the other thereof being tuned to dampen second mode vibrations in the second frequency.

6. In an internal combustion engine, in combination, a crankshaft system including a flywheel at one end of the crankshaft, said system in undamped condition having a first mode of vibration of a frequency low enough so that resonance of said frequency and at least one order of the exciting engine torque occurs within the operating speed range of the engine whereby the system is subjected to substantial first mode torsional vibrations, said system also having a second mode of vibration of a second frequency too high for substantial resonant vibrations within said speed range, a pair of rubber-type torsional vibration dampers fixed to the end of the crankshaft opposite the flywheel, said dampers comprising inertia members of different weights and means including rubber-like bodies providing independent operative connections of the members to the shaft, the damper having the heavier member lowering said first and second frequencies of torsional vibration of the undamped system so that said second mode frequency falls within said speed range whereby resonance of the second frequency and at least one order of the exciting engine torque occurs to subject the system to substantial second mode torsional vibrations, said heavier damper being tuned to dampen torsional vibrations in the first mode and the other vibration damper being tuned to dampen torsional vibrations in the second mode.

7. In combination with an internal combustion engine, a crankshaft, a flywheel fixed to one end of said crankshaft, said crankshaft being subject to a first mode of torsional vibration at a first natural frequency, a device connected to said crankshaft for receiving driving movement therefrom, said device being operative during engine operation to introduce a second mode of torsional vibration of a second natural frequency in said crankshaft, a dynamic torsional vibration damper secured to said crankshaft at that end thereof opposite said flywheel, said vibration damper causing the natural frequencies of torsional vibration of said shaft to be lowered and being tuned to dampen the first mode of torsional vibration therein, and an additional dynamic torsional vibration damper secured to said crankshaft at that end thereof opposite said flywheel and tuned to dampen the second mode of torsional vibration therein.

8. In a multi-cylinder internal combustion engine, a crankshaft having a flywheel secured to one end thereof, a pair of dynamic torsional vibration dampers secured to that end of said crankshaft opposite said flywheel, said crankshaft with said dampers attached being subject to torsional vibrations in two different modes due to resonance with various orders of the exciting engine torque at two different natural frequencies at engine speeds within the operating range of the engine, one of said dynamic torsional vibration dampers causing the undamped natural frequencies of said crankshaft to be lowered and being tuned to damp the mode of torsional vibrations of one lowered fundamental frequency, and the second dynamic torsional damper being tuned to damp the mode of torsional vibrations of the other lowered fundamental frequency, said dampers being of the type that is tuned to suit the frequency of a mode of shaft vibration and is operative at all of the different order critical speeds of that mode.

9. In a multi-cylinder internal combustion engine, having a crankshaft with a flywheel secured to one end thereof, the combination of a pair of dynamic torsional vibration dampers secured to said crankshaft at the end opposite said flywheel, said dampers comprising balancer weights of different masses and elastic means including damping for independently connecting the weights to the shaft, said crankshaft with said dampers secured thereto being subject to two different modes of torsional vibrations at two different fundamental frequencies within the operating range of the engine, the heavier of said torsional vibration dampers lowering the original fundamental frequencies of said shaft and being tuned to damp the mode of torsional vibration having the lower frequency, and the second torsional vibration damper being tuned to damp the other of said modes of torsional vibration.

10. A two-mode torsional vibration damper comprising a retainer adapted to be secured to a vibratory shaft and having a pair of axially spaced radial flanges, a pair of independent annular balancer weights of different masses between said flanges, a bonded rubber connection between one weight and one flange, and a bonded rubber connection between the other weight and other flange.

11. A two-mode torsional vibration damper comprising a retainer adapted to be secured to a vibratory shaft and having radial flange means, a pair of axially spaced independent annular balancer weights of different masses, a bonded rubber connection between one weight and the flange means, and a bonded rubber connection between the other weight and the flange means.

THOMAS H. PEIRCE.

REFERENCES CITED

The following references are of record in the file of this patent:

UNITED STATES PATENTS

| Number | Name | Date |
|---|---|---|
| 1,918,249 | Dashefsky | July 18, 1933 |
| 2,041,507 | Zeder | May 19, 1936 |
| 2,062,369 | Meyer | Dec. 1, 1936 |
| 2,103,643 | Salomon | Dec. 28, 1937 |
| 2,343,421 | Porter | Mar. 7, 1944 |
| 2,346,972 | Kishline | Apr. 18, 1944 |

FOREIGN PATENTS

| Number | Country | Date |
|---|---|---|
| 163,966 | Switzerland | Nov. 16, 1933 |